United States Patent [19]

Smith et al.

[11] 3,794,877

[45] Feb. 26, 1974

[54] JITTER IMMUNE TRANSISTORIZED VERTICAL DEFLECTION CIRCUIT

[75] Inventors: Lawrence Edward Smith; David Lynn Neal, both of Indianapolis, Ind.

[73] Assignee: RCA Corporation, New York, N.Y.

[22] Filed: Mar. 30, 1972

[21] Appl. No.: 239,483

[52] U.S. Cl. .......... 315/27 TD
[51] Int. Cl. .......... H01j 29/70
[58] Field of Search ... 315/276 D, 27 R, 27 TD, 25, 315/26

[56] References Cited

UNITED STATES PATENTS

| | | | |
|---|---|---|---|
| 3,408,580 | 10/1968 | Moriyasu | 315/27 R |
| 3,684,920 | 8/1972 | Smith | 315/27 TD |
| 3,428,855 | 2/1969 | McDonald | 315/27 TD |

*Primary Examiner*—Maynard R. Wilbur
*Assistant Examiner*—J. M. Potenza
*Attorney, Agent, or Firm*—E. M. Whitacre; W. H. Meagher; C. I. Brodsky

[57] ABSTRACT

U.S. Pat. No. 3,684,920 issued on Aug. 15, 1972 and based on U.S. Patent Application Serial No. 37,668, filed May 15, 1970, describes a transistor deflection circuit employing an output stage of class B, push-pull complementary symmetry type and a Miller integrator approach for the sawtooth wave generation. This invention describes a modification to the discharge circuitry thereof to improve the vertical deflection stability in the presence of spurious pulses which tend to undesirably and randomly trigger and/or retrigger the discharge switch. An additional "blanker" transistor is employed to sense the voltage across the vertical yoke winding so as to bypass the spurious signals away from the discharge switch during the vertical retrace interval when the danger exists that the deflection circuits will be falsely triggered.

6 Claims, 1 Drawing Figure

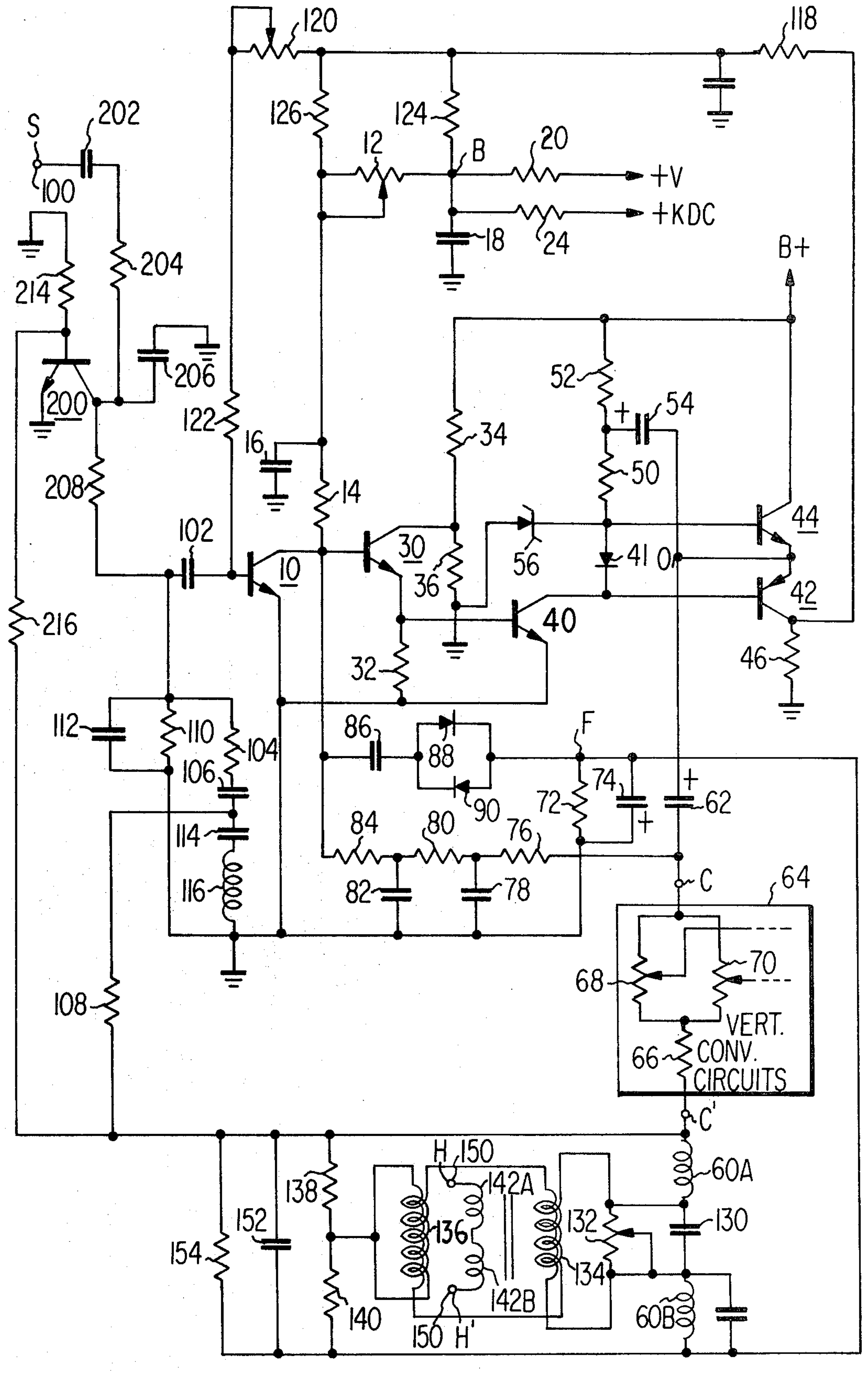
S
+V
+KDC
B+
VERT.
CONV.
CIRCUITS

JITTER IMMUNE TRANSISTORIZED VERTICAL DEFLECTION CIRCUIT

FIELD OF THE INVENTION

This invention relates to transistorized vertical deflection circuits for color television receivers and, more particularly, to a modification of such circuits as described in the pending U.S. Pat. Application Ser. No. 37,668, filed May 15, 1970 now U.S. Pat. No. 3,684,920 issued Aug. 15, 1972, and assigned to the same assignee as is this instant invention.

DESCRIPTION OF THE PRIOR CIRCUIT

The Ser. No. 37,668 case describes a transistorized vertical deflection circuit employing an output stage of class B, push-pull, complementary symmetry configuration, having a negative feedback path incorporating capacitance between the output stage and the input of a driver stage to establish a Miller integrator type of operation. A coupling of the output stage to the vertical yoke windings was effected by means of a capacitor so as to eliminate problems of impedance matching to the windings and to avoid waveform distortion problems associated with the more usual output transformer type of coupling. While thus similar in respects to the transistor deflection circuit described in U.S. Pat. No. 2,964,673 - Stanley, the specific apparatus of the aforesaid U.S. Pat. No. 3,684,920 proved advantageous in stabilizing the output waveform in the presence of line voltage variations and loading extremes. The deflection winding circuitry additionally cancelled horizontal frequency voltage components introduced for purposes of dynamic pincushion correction from the vertical deflection feedback paths to reduce the possibility of interlace disturbances.

SUMMARY OF THE PRESENT INVENTION

As will become clear hereinafter, the apparatus of this invention modifies the manner in which the vertical synchronizing pulse waveform is applied to the input electrode of the discharge switch of my pending case. More specifically, whereas the circuitry of that application employed a resistor divider to establish a direct voltage for reverse biasing a coupling diode during the interval between vertical synchronizing pulses--thereby isolating the discharge transistor from the synchronizing input terminal to avoid untimely triggering during vertical trace--, the apparatus of the instant invention employs a "blanker" transistor to bypass any spurious signals which might occur during retrace intervals away from the discharge transistor. The "blanker" transistor is coupled to respond to the voltage waveform developed across the vertical yoke windings and is poled for conduction during the vertical retrace interval when the noise pulses occur.

BRIEF DESCRIPTION OF THE DRAWING

This and other advantages of the present invention will be more clearly understood from a consideration of the following description taken in connection with the accompanying drawing which schematically illustrates a transistorized vertical deflection circuit for a color television receiver as employed in the aforesaid U.S. Pat. No. 3,684,920, and modified in accordance with an embodiment of this invention.

DETAILED DESCRIPTION OF THE DRAWING

In the drawing, five transistors are shown. The first transistor 10 is of NPN conductivity type, having a grounded emitter electrode and a collector electrode coupled to a direct potential supply point B via a variable resistor 12 (which serves as an adjustable height control for the system) serially connected with a fixed resistor 14 (which determines the maximum height obtainable). Filter capacitors 16 and 18 respectively couple the junction of resistors 12 and 14 and the potential point B to ground, with the potential developed at supply terminal B resulting from a combination of a stabilized direct voltage (+V) applied through a resistor 20 and a direct potential (+KDC) which varies with changes in kinescope ultor potential, applied by means of a resistor 24. In television receivers lacking tight regulation of the kinescope ultor potential, the provision of this varying KDC component permits automatic adjustment of any sawtooth waveform amplitude in a direction to preclude raster height change with ultor potential variation. Where tight regulation of the ultor potential is provided, on the other hand, this variable KDC component may be omitted.

The collector electrode of transistor 10 is also connected to the base electrode of a second NPN transistor 30, having an emitter electrode returned to ground by means of a resistor 32. The collector electrode of transistor 30 is also coupled first, via a resistor 34 to a B+ potential supply terminal and second, via a resistor 36 to ground. The emitter electrode of transistor 30 is additionally connected to the base electrode of a third NPN transistor 40, having a grounded emitter electrode and a collector electrode which directly connects to the base electrode of one of the two remaining transistors 42.

The transistor 42 is shown as part of a class B, push-pull, complementary symmetry output stage employing an additional transistor 44, the transistor 42 being of PNP conductivity type and the transistor 44 being of NPN type. As illustrated, the emitter electrodes of these two devices are interconnected, with the collector electrode of transistor 44 being in turn coupled to the B+ supply terminal and with the collector electrode of transistor 42 being returned to ground by a resistor 46. Signal drive is provided the transistor 44 by means of a semiconductor rectifier 41 having its cathode electrode connected to the collector electrode of transistor 40 and its anode electrode connected to the base electrode of transistor 44 and to the B+ supply by means of a pair of serially coupled resistors 50, 52. Such connections forward bias rectifier 41 and provide a voltage drop across it which serves as an offset voltage between the base electrodes of transistors 42, 44 to aid in minimizing cross-over distortion at the center of scan. As will become apparent to one skilled in the art, the alternating current feedback effects present in the illustrated circuit will alternatively permit deletion of this rectifier without significantly increasing signal distortion.

Also forming part of the complementary symmetry output stage is a "bootstrap" capacitor 54 which couples the common junction of the emitter electrodes of transistors 42, 44 to the junction between resistors 50, 52 while a reverse biased rectifier 56 is coupled between the base electrode of transistor 44 and ground. As described in the aforesaid Pat. No. 3,684,920, such use of the rectifier 56 insures a deflection waveform of a substantially fixed level independent of B+ variation and retrace interval duration so as to minimize annoying disturbances of raster size. As therein disclosed, during retrace, when transistor 44 is conductive, rectifier 56 is biased into its zener region to operate as a zener diode holding the voltages at the base and emitter electrodes of transistor 44 at a substantially constant level, independent of B+ variations.

An output terminal O is connected to the joined emitter electrodes of transistors 42, 44, and supplies deflection current to the respective halves 60A and 60B of the vertical yoke winding of the television receiver by means of an electrolytic coupling capacitor 62 in series connection with the vertical convergence circuitry 64. Such convergence circuit 64 includes a resistor 66 serially coupled with a pair of parallel connected potentiometers 68, 70 which causes the convergence circuitry to appear to the deflection current as a relatively low impedance, essentially resistive network. The deflection current path is returned to chassis ground by means of a resistance-capacitance network including a current sampling resistor 72 in shunt connection with a capacitor 74.

A pair of resistance-capacitance integrating circuits are arranged in cascade connection with respect to a terminal C at the junction between capacitor 62 and vertical convergence circuit 64 for use in S-shaping the deflection output current. In particular, a first resistor 76 and capacitor 78 form one of these integrating circuits, for connection to a second resistor 80 and capacitor 82 forming the other of these circuits to develop an essentially parabolic voltage wave across capacitor 82 from a sawtooth signal and superimposed retrace pulse which exists at the terminal C. This voltage wave is applied by means of an additional resistor 84 to the base electrode of transistor 30 for a final integration resulting in the desired S-shaping component.

As in the aforesaid U.S. Pat. No. 3,684,920, a negative feedback path, including a capacitor 86, is looped around the deflection signal amplifier, extending between a feedback terminal F (at the ungrounded end of sampling resistor 72) in the amplifier output circuit and the base electrode of transistor 30. Alternate charging of capacitor 86 from the supply point B exists by a path including resistors 12 and 14, a semiconductor rectifier 88 and the resistor 72 to ground. Discharge of the capacitor 86 occurs by means of a path including the resistor 72, a further semiconductor rectifier 90, and the transistor 10 to provide a sawtooth wave generation in accordance with Miller Integrator Principles. With feedback of flyback pulses being applied to the base electrode of transistor 10 from a terminal C′ at the junction of the vertical yoke winding 60A and convergence circuits 84, a form of astable multivibrator action is developed between the discharge and output stages of the amplifier to render the vertical deflection circuit self-oscillatory at a frequency which is slightly less than the television field rate. Precise synchronization of the oscillations at the correct rate is obtained under the control of vertical synchronizing pulses derived from a synchronizing waveform supplied at an input terminal 100. As shown, semiconductor rectifiers 88 and 90 are coupled in oppositely poled, parallel connection, with the anode electrode of rectifier 88 being coupled to the capacitor 86 and with the anode electrode of the rectifier 90 being coupled to ungrounded end of resistor 72.

Also coupled to the base electrode of transistor 10 is a series connection of a first capacitor 102, a first resistor 104, a second capacitor 106, and a second resistor 108, in the order named, to the terminal C′ junction of yoke winding 60A and convergence circuits unit 64. Such arrangement serves to apply a flyback pulse derived in the deflection output circuit to the base electrode of transistor 10. A parallel resistance-capacitance network comprising a resistor 110 and a capacitor 112 is connected between ground and the junction of capacitor 102 with resistor 104 to cooperate with the resistor 104 and capacitor 106 in shaping the feedback pulse. A series resonant network including a capacitor 114 and an inductor 116 is tuned to the horizontal deflection frequency and is connected between chassis ground and the junction of capacitor 106 with resistor 108 to cooperate with resistor 108 in attenuating residual horizontal frequency components in reducing interlace disturbance.

A resistive path, including the resistor 46 connected in the collector circuit of transistor 42, is also included in providing feedback to the base electrode of transistor 10. In particular, a resistor 118, a potentiometer 120, and a resistor 122 are serially coupled in the order named between the collector electrode of transistor 42 and the base electrode of transistor 10, to integrate a sawtooth component developed by transistor 42 and to provide a resultant voltage waveform at transistor 10 which is sharpely rising at the end of the trace interval to provide resultant noise immunity advantages. Potentiometer 120 is adjustable to provide a control over the slope of the rising waveform to thereby conveniently serve as a vertical hold control for the arrangement. A pair of resistors 124, 126 are further included to respectively couple the opposite ends of variable resistor 12 to the junction between resistors 118 and 120. Such connections serve to apply a variable direct current component to the base electrode of transistor 10, to provide a compensation where adjustment of the height control potentiometer 12 serves to undesirably vary the operating frequency of the deflection circuitry and thus cause loss of a synchronization. These connections also introduce a compensation at the base electrode of transistor 10 to offset any variation in the +KDC component which might otherwise alter the frequency of the developed output waveform.

Interposed between the winding halves of the vertical yoke 60A-60B is top-and-bottom pincushion circuitry including a parallel resistance-capacitance network of a capacitor 130 and a variable resistor 132. An output winding 134 of a saturable reactor is serially connected with an adjustable coil 136, with both the winding 134 and the coil 136 having two bifilar wound segments. The bifilar wound segments of the inductor 136 are interposed between the reactor winding segments in the deflection current path, and the junction of the coil 136 segments is connected to the junction of a pair of damping resistors 138, 140. The end terminals of resistors 138, 140 remote from their junction are respectively connected, as shown, to the terminal C′ junction of yoke half 60A with convergence circuit 64 and to the ungrounded end of sampling resistor 72. The input windings for the arrangement, 142A, 142B, are energized in series with a horizontal rate component derived from suitable terminals 150 in the receiver's horizontal deflection circuit (not illustrated).

Such pincushion correction is similar to that disclosed in U.S. Pat. No. 3,329,859, and is one in which a horizontal frequency component of a first polarity and declining magnitude during the first half of trace is caused to flow in the vertical windings and is of the opposite polarity and rising magnitude during the second half of trace. To obtain an adequate level of drive, the reactor output winding is nominally tuned to the horizontal frequency by capacitor 130, with adjustable coil 136 providing a vernier frequency adjustment for precise phasing control. Variable resistor 132, which controls the Q of the resonance circuit, provides a facility for adjusting the magnitude of correction.

Lastly, a capacitor 152 and a resistor 154 are connected in parallel, and across the resistors 138, 140. This connection serves to match the resistance-capacitance time constant of the sampling network 72, 74 at the horizontal frequency with the time constant afforded when capacitor 152 is inserted to lower the impedance between the sampling resistor 72 and the terminal C′ junction of winding 60A with convergence circuit 64. Such arrangement is included as a means to prevent the horizontal frequency component voltage from appearing across the deflection windings and thereby disturb the deflection circuit operation, causing a loss of interlace. This choice of time constant combines with the use of the resonant network 114, 116--and further, with a shunting capacitor 74 of sufficiently large value to bypass the sampling resistor 72 to a moderate degree at horizontal frequency--to cancel the horizontal frequency component from the signal which is fed back to the transistors 10, 30.

The vertical circuitry, as so far described, is similar to that disclosed in the Ser. No. 37,668 application, the disclosure of which as is pertinent to the foregoing being herewith incorporated by reference. According to the present invention, however, a sixth transistor is included-as is distinct from the arrangement disclosed in my pending case--to isolate the discharge transistor 10 from the synchronizing input terminal 100 during the interval following turn-on of transistor 10, throughout the vertical retrace period and sufficiently into the trace period to prevent re-triggering of this transistor. With the inclusion of this transistor, immunity to vertical jitter has been enhanced under conditions of compressed vertical synchronizing amplitude, low signal-to-noise ratio, co-channel interference, impulse noise, and cross-modulation. Such arrangement, as to be described below, has proven more reliable in avoiding untimely triggering than the semiconductor diode isolating arrangement disclosed in the U.S. Pat. No. 3,684,920 specification.

Referring more particularly to the drawing, this sixth transistor 200 is coupled with its emitter electrode connected to ground and with its collector electrode connected to the synchronizing waveform input terminal 100 by means of a capacitor 202 and a resistor 204. Capacitor 202 is used to inhibit those conditions under which a direct current voltage may appear at the collector electrode of transistor 200 of sufficient magnitude to hamper the proper operation of the vertical oscillator, while resistor 204 combines with a further capacitor 206, coupled between the collector electrode of transistor 200 and ground to form an integrator network for reducing the horizontal component of the composite synchronizing signal. A second resistor 208 couples the junction between the components 204, 206 via the multivibrator capacitor 102 to the discharge switch transistor 10.

Also shown are a resistor 214 which couples the base electrode of transistor 200 to ground and a resistor 216 which couples the base electrode of transistor 200 to the terminal junction C′ between the yoke winding 60A and the convergence circuit 64. Resistors 214 and 216 are selected of such resistance value to place transistor 200 in its conductive state during most of the vertical retrace interval, to short-circuit to ground any spurious trigger information which might occur during that time and otherwise, undesirably switch the conductivity state of transistor 10. The time of conduction for transistor 200 can be adjusted for optimum spurious signal rejection by adjusting the values of these resistors--noting, however, that the instant at which transistor 200 is first turned-on is of major concern in providing this improved vertical stability. That is transistor 200 should not turn-on until the discharge transistor 10 has received sufficient energy to operate, and, in addition, should not turn-off during the time that spurious or unwanted signals are present. The voltage developed across the vertical yoke coils will generally be of a form sufficient to fulfill these criteria so as to isolate the discharge transistor from the synchronizing terminal 100 by coupling any spurious components to ground during the intervals between vertical synchronizing periods.

Such improved vertical stability has been attained with the modification provided by this invention, by employing the following component values in a configuration similar to that described in the aforesaid U.S. Pat. No. 3,684,920.

| Component | Value |
|---|---|
| Capacitor 202 | 0.1 microfarads |
| Capacitor 206 | 0.01 microfarads |
| Resistor 204 | 22 kilohms |
| Resistor 208 | 8.2 kilohms |
| Resistor 214 | 6.8 kilohms |
| Resistor 216 | 150 kilohms |

While there has been described what is considered to be a preferred embodiment of the present invention, it will be readily apparent that other modifications may be made by those skilled in the art without departing from the teachings herein of employing, in effect, a synchronizing blanker transistor for improved vertical stability.

What is claimed is:

1. In a television receiver of the type comprising:

a. a cathode-ray kinescope;

b. a vertical deflection circuit including a capacitor and a current source from which said capacitor is charged in developing a vertical deflection rate signal for the electron beam of said kinescope;

c. a vertical deflection yoke winding coupled to an output terminal of said deflection circuit, with flyback pulses appearing across said winding during periodically recurring retrace intervals;

d. a first transistor having an output electrode direct current conductively connected to an input terminal of said deflection circuit, with said transistor being rendered nonconductive during recurring trace intervals to permit the development of said vertical deflection rate signal by said capacitor and being rendered conductive during said recurring retrace intervals to inhibit the development of said deflection rate signal; and e. a composite synchronizing signal source;

the combination therewith of:

means for supplying vertical deflection rate trigger pulses to said first transistor for initiating the conduction thereof in response to said trigger pulses, said means including a signal path coupled between said synchronizing signal source and an input electrode of said first transistor, said signal path including as a serial element thereof a first impedance;

a second transistor having a collector electrode coupled to a terminal of said first impedance remote from said source, an emitter electrode coupled to a point of reference potential, and a base electrode;

means coupled to said deflection yoke winding for applying a voltage waveform appearing across deflection yoke winding to the base electrode of said second transistor to initiate conduction of said second transistor subsequent to said first transistor during each of said retrace intervals, the conduction of said second transistor persisting through the remainder of each said retrace interval and the initial portion of the succeeding trace interval, to thereby bypass spurious trigger pulses occurring after said first transistor has initially been rendered conductive through said second transistor and away from said first transistor.

2. The combination of claim 1 wherein said vertical deflection circuit includes an output stage comprising third and fourth transistors of opposite conductivity type having their emitter electrodes connected to said output terminal, their base electrodes connected to an input terminal, and their respective collector electrodes connected to a unidirectional voltage supply terminal and said point of reference potential, respectively, with one of said third and fourth transistors conducting during the initial half of recurring trace intervals and with the other of said third and fourth transistors conducting during the final half thereof.

3. The combination of claim 1 wherein said first impedance comprises a resistor, and wherein said means for supplying vertical deflection rate trigger pulses includes integrator circuit means for reducing the horizontal synchronizing component of composite synchronizing signals from said source and for selecting the vertical synchronizing component of said composite signals to the relative exclusion of said horizontal synchronizing component, said integrator circuit means including said resistor and a second capacitor coupled between the collector electrode of said second transistor and said point of reference potential.

4. The combination of claim 2 wherein said vertical deflection circuit further includes a fifth transistor having an output electrode direct current conductively connected to said input terminal of said deflection output stage, with said fifth transistor being conductive during said recurring trace intervals and being nonconductive during said retrace intervals in response to said vertical deflection rate signal.

5. In a television receiver including a source of composite synchronizing signals comprising a horizontal deflection synchronizing component and a vertical deflection synchronizing component, a vertical deflection circuit comprising, in combination:

a first capacitor;

a source of charging current coupled to said first capacitor;

a discharge transistor coupled to said first capacitor for discharging said first capacitor when rendered conducting, said first capacitor being subject to charging by current from said charging current source when said discharge transistor is nonconducting, said discharge transistor having a control electrode;

a deflection yoke winding;

a deflection wave amplifier responsive to a voltage was developed by the charging of said first capacitor by said current and the discharging of said first capacitor by said discharge transistor, said deflection wave amplifier having an output circuit including said deflection yoke winding;

an integrating circuit coupled to said source of composite synchronizing signals and including the series combination of a resistor and a second capacitor;

means, including a signal path between said control electrode of said discharge transistor and the junction of said resistor and second capacitor of said integrating circuit, for rendering said discharge transistor responsive to said vertical synchronizing component as developed across said second capacitor;

a second transistor having a base electrode, and having an emitter-collector path shunted across said second capacitor;

means, including a coupling between said output circuit and said base electrode of said second transistor, for causing conduction in said emitter-collector path during a terminal portion of each interval of discharging of said first capacitor by said discharge transistor and during an initial portion of each succeeding interval of charging of said first capacitor in response to a voltage waveform developed across said deflection yoke winding.

6. Apparatus in accordance with claim 5 also including:

a second integrating circuit, coupled to the junction of said first-named resistor and second capacitor, and including the series combination of a second resistor and a third capacitor, said second resistor being included in said signal path.

* * * * *